Patented Dec. 12, 1922.

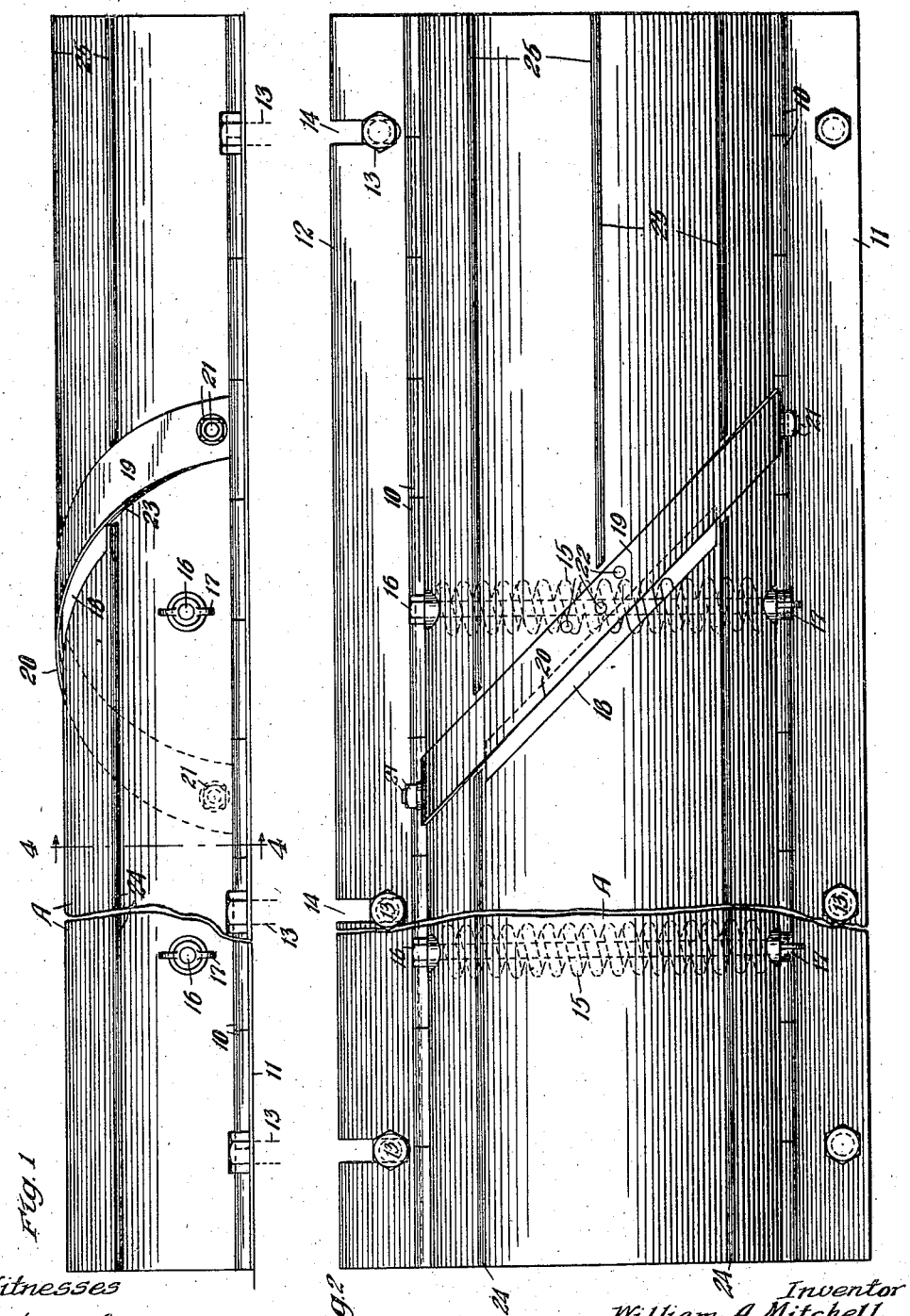

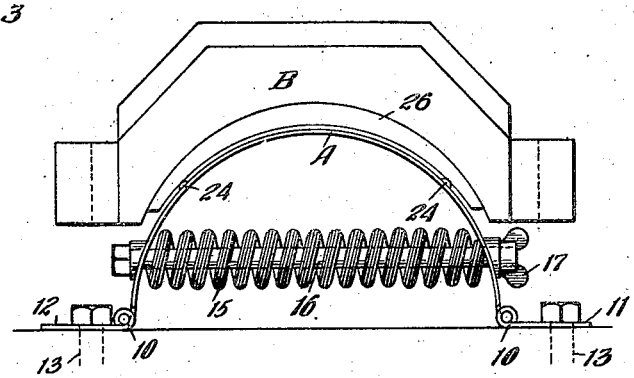
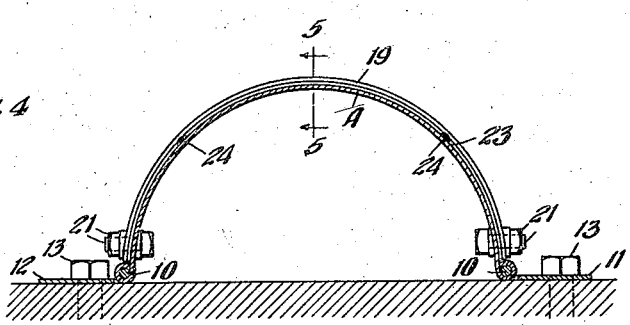
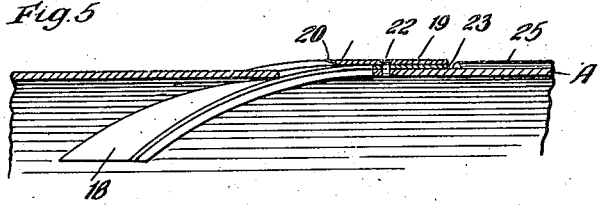

1,438,389

UNITED STATES PATENT OFFICE.

WILLIAM A. MITCHELL, OF DENISON, TEXAS.

ADJUSTABLE DEVICE FOR DRESSING DOWN BEARINGS.

Application filed October 27, 1921. Serial No. 510,922.

*To all whom it may concern:*

Be it known that I, WILLIAM A. MITCHELL, a citizen of the United States, residing at Denison, in the county of Grayson and State of Texas, have invented a certain new and useful Improvement in Adjustable Devices for Dressing Down Bearings, of which the following is a full, clear, concise, and exact description, reference being had to the accompanying drawings, forming a part of this specification.

This invention relates to improvements in adjustable device for dressing down bearings.

In the operation and maintenance of railway rolling stock, one of the greatest sources of difficulty is that arising from hot journals or hot-boxes. The most common cause for hot journals is the failure to use a proper size bearing for the journal. Journals are made of standard size and the bearings are also made to similar standard size. As the journals are used in service, the same become gradually worn and when a new bearing is applied thereto, the journal is not of standard size and consequently, an improper fit between the bearing and the journal results.

The object of my invention is to provide an adjustable device of simple form which may be used to dress down a bearing, usually made of babbitt, to the proper radius corresponding with the particular journal with which it is to be used, to thereby obtain more efficient operation and avoid hot journals or hot-boxes.

In the drawings forming a part of this specification, Figure 1 is a longitudinal side elevational view of a device embodying my improvement. Fig. 2 is a top plan view of the construction illustrated in Fig. 1. In both Figs. 1 and 2 parts are broken away in order to better accommodate the figures on the sheet. Fig. 3 is an end elevational view of the construction illustrated in Fig. 1 and showing also a well-known form of journal bearing in connection therewith. Fig. 4 is a vertical transverse sectional view corresponding substantially to the section line 4—4 of Fig. 1. And Fig. 5 is a longitudinal enlarged detail sectional view corresponding substantially to the section line 5—5 of Fig. 4.

In carrying out my invention, the main or body member of the device consists of a relatively elongated member A of flexible metal, preferably sheet steel. Said member A is curved or bent to provide an arcuate cross-section, as clearly indicated in Figs. 3 and 4. In length, the member A is made considerably longer than a journal bearing of the common railroad type, one of which is indicated at B in Fig. 3 so as to provide proper support for the bearing at all times while it is being moved back and forth on my device, as hereinafter explained.

Pivotally connected to each edge of the member A as by the piano type of hinge 10, are side wings 11 and 12. The wing 11 is provided with a plurality of openings to accommodate a corresponding number of bolts or screws 13—13 by which said wing or flange may be rigidly secured to a work bench or other suitable support. The other wing 12 is provided with a series of slots 14—14 through which extend other securing bolts 13—13, the slots 14, however, permitting adjustment toward and from the other wing 11, as will be understood. In this manner, it is evident that the arcuate contour of the main member A can be varied as desired to obtain the proper radius and curvature for any desired size of journal bearing.

I also preferably employ in conjunction with the main member A, a plurality of transversely arranged expansible springs 15—15 on the interior thereof, said springs being mounted on transversely extending bolts 16 having wing nuts 17 by which the adjustment may be effected, as will be clear from an inspection of Fig. 3.

Intermediate its ends, the flexible member A is formed with a diagonally extending opening or recess 18. Extending over said opening 18 and also similarly arranged diagonally of the member A, is a plate or band-like knife 19 having its cutting edge 20 disposed over the opening 18, as indicated in Fig. 5. The knife 19 is secured at its ends to the member A as by bolts and nuts 21—21. The knife 19 is also preferably riveted to the main member or shell A near the top of the latter as indicated by the rivets 22—22. Where the band knife 19 is relatively thin, a shim 23 may be interposed between it and the main member A and secured by the rivets 22 as shown in Fig. 5 to thereby bring the cutting edge of the knife the desired distance above or outside of the surface of the member A. With this construction of knife, it is evident that the knife will conform to the contour of the member A as the latter is adjusted for different size bearings.

In order to facilitate the movements of the bearing back and forth on my device and insure the proper removal of the babbitt material by the knife in comparatively thin shavings, I employ longitudinally extending shallow ribs 24—24 forwardly of the knife and other longitudinally extending shallow ribs 25—25 rearwardly of the knife. The ribs 24 are preferably two in number, one on each side of the center line and approximately $\frac{1}{32}''$ lower than the knife edge. The ribs 25 are preferably three in number, disposed as shown, the tops of the same being very slightly below the level of the knife.

The device is used as follows. Preferably the device is secured to a work bench as heretofore explained, the main member A being adjusted to the desired radius corresponding to the radius of the journal with which the bearing is to be used. The bearing block B with its inlay of Babbitt metal 26 is then applied on the device as shown in Fig. 3 and pushed toward the right against the cutting edge of the knife, as will be understood, the shavings dropping through the opening 18. By working the journal bearing back and forth over the dressing down device, it is evident that the contour of the babbitt can be made to conform to the desired curvature corresponding with the journal with which it is to be used.

I have herein shown and described what I now consider the preferred manner of carrying out the invention, but the same is merely illustrative and I contemplate all changes and modifications that come within the scope of the claims appended hereto.

I claim:

1. In a device of the character described, the combination with a flexible relatively elongated body member of arcuate cross-section; means for adjustably securing the longitudinal edges of said body member to a suitable support with said edges at different distances apart with corresponding variations in the cross-sectional contour of the body member; and a knife extending crosswise of the body member on the outer side thereof and having its effective cutting edge above the surface of the body member.

2. In a device of the character described, the combination with a flexible relatively elongated body member of curved cross-section transversely thereof; means for adjusting and retaining in adjusted position, the longitudinal edges of said member toward and from each other; and a knife extending crosswise of the body member on the outer side thereof, the effective cutting edge of the knife being above the surface of said member and the latter being recessed adjacent the knife edge to allow shavings to pass therethrough.

3. In a device of the character described, the combination with a flexible relatively elongated body member of curved cross-section transversely; of a band-like knife secured to the outer side of said member and flexible in unison with the latter; and means for adjusting the longitudinal edges of said member toward and from each other and maintaining the same in adjusted position to thereby effect corresponding variations in the radius of curvature of said member and knife.

4. In a device of the character described, the combination with a flexible relatively elongated body member of curved cross-section transversely thereof; means for adjusting and retaining in adjusted position, the longitudinal edges of said member toward and from each other; a knife extending crosswise of the body member on the outer side thereof, the effective cutting edge of the knife being above the surface of said member and the latter being recessed adjacent the knife edge to allow shavings to pass therethrough; and shallow, longitudinally extending rib guides on the outer side of said member disposed forwardly and rearwardly of the knife.

5. In a device of the character described, the combination with a relatively elongated body member of flexible sheet metal of curved cross-section transversely; of a knife on the outer side of said member extending crosswise thereof and flexible in unison with said member; and means for adjusting the free edges of said member relatively toward and from each other, said means including a series of bolts extending transversely through said member, adjusting nuts on the ends of said bolts, and expansion springs mounted on said bolts within said member.

6. In a device of the character described, the combination with a flexible sheet metal body member of relatively elongated form and curved in transverse section; of a pair of wings pivotally connected to the longitudinal edges of said member, said wings being adapted to accommodate fastening devices therethrough; and a knife extending crosswise of said member on the outer side thereof and having its effective cutting edge above the surface of said member, the latter being recessed adjacent the knife edge to allow shavings to pass therethrough.

7. In a device of the character described, the combustion with a flexible sheet metal member curved transversely; a pair of wings pivotally connected to the longitudinal edges of said member and by which the device is adapted to be secured to a suitable support;

a band-like knife secured to the outer side of said member and extending diagonally of the latter with the cutting edge of the knife above the surface of said member, the latter being recessed adjacent the knife edge to allow shavings to pass therethrough; a plurality of bolts extending transversely of and mounted on said member below the crown thereof, adjusting nuts on said bolts; and expansible springs on said bolts on the interior of said member.

In witness that I claim the foregoing I have hereunto subscribed my name this 21st day of Oct., 1921.

WILLIAM A. MITCHELL.

Witnesses:
G. G. FAIRLEY,
W. S. CLARK.